United States Patent
Hache

(10) Patent No.: US 8,484,908 B2
(45) Date of Patent: Jul. 16, 2013

(54) MOBILE MULTI-FUNCTIONAL SHELTER UNIT

(75) Inventor: Alcide Hache, Riviere du Portage (CA)

(73) Assignee: One 4 Haul Trans4mer Ltd., Alberta (CA)

( * ) Notice: Subject to any disclaimer, the term of this patent is extended or adjusted under 35 U.S.C. 154(b) by 188 days.

(21) Appl. No.: 12/849,416

(22) Filed: Aug. 3, 2010

(65) Prior Publication Data

US 2011/0120026 A1      May 26, 2011

Related U.S. Application Data

(60) Provisional application No. 61/244,107, filed on Sep. 21, 2009.

(51) Int. Cl.
| E04B 1/346 | (2006.01) |
| E04B 7/16 | (2006.01) |
| E04B 1/34 | (2006.01) |
| E04H 1/00 | (2006.01) |
| E04H 1/12 | (2006.01) |
| B60P 3/34 | (2006.01) |
| B62C 1/06 | (2006.01) |
| B62D 33/08 | (2006.01) |
| B60R 15/00 | (2006.01) |

(52) U.S. Cl.
USPC ....... 52/143; 52/66; 52/67; 52/79.5; 296/175; 296/26.02; 296/26.05; 296/26.13; 137/234.6

(58) Field of Classification Search
USPC ............... 52/64, 66, 67, 68, 69, 79.1, 79.5, 52/143; 296/165, 171, 175, 26.01, 26.02, 296/26.03, 26.04, 26.05, 26.12, 26.13; 137/234.6
See application file for complete search history.

(56) References Cited

U.S. PATENT DOCUMENTS

| 2,765,499 | A | | 10/1956 | Couse | |
| 3,308,845 | A | * | 3/1967 | Bellas et al. | 137/234.6 |
| 3,463,538 | A | * | 8/1969 | Koon | 296/173 |
| 3,505,767 | A | | 4/1970 | Fyle, Jr. | |
| 3,645,559 | A | | 2/1972 | Stafford, Jr. | |
| 3,941,414 | A | * | 3/1976 | Platt | 296/170 |
| 4,253,283 | A | * | 3/1981 | May | 52/67 |
| 4,746,260 | A | | 5/1988 | Norvell | |
| 4,789,281 | A | * | 12/1988 | Westerdale | 410/29.1 |
| 4,981,318 | A | * | 1/1991 | Doane et al. | 296/182.1 |
| 5,154,469 | A | * | 10/1992 | Morrow | 296/26.02 |
| 5,706,616 | A | * | 1/1998 | Fernandez | 52/143 |
| 5,832,676 | A | * | 11/1998 | Gillmore et al. | 52/67 |
| 5,833,294 | A | * | 11/1998 | Williams et al. | 296/24.32 |
| 6,296,028 | B1 | * | 10/2001 | Oakland | 141/231 |
| 6,302,475 | B1 | * | 10/2001 | Anderson | 296/175 |
| 6,712,414 | B2 | * | 3/2004 | Morrow | 296/26.01 |
| 7,112,029 | B1 | * | 9/2006 | Neatherlin | 414/458 |

(Continued)

*Primary Examiner* — Ryan Kwiecinski
(74) *Attorney, Agent, or Firm* — Knobbe Martens Olson & Bear LLP

(57) ABSTRACT

A mobile multi-functional shelter unit, for use as a general working area or for storing and maintaining heavy machinery. The mobile multi-functional shelter unit includes a central structure that has a deployed state and a non-deployed state as well as means for translating from the deployed state to the non-deployed state. The central structure has a base section, a central floor mounted on top of the base section, track means for raising a vehicle from a ground surface onto and off of the central floor. The central structure supports a raisable roof assembly and a lateral pullout assembly.

15 Claims, 17 Drawing Sheets

U.S. PATENT DOCUMENTS

| | | | |
|---|---|---|---|
| 7,828,367 B2* | 11/2010 | Hickam et al. | 296/156 |
| 2003/0115808 A1* | 6/2003 | Morrow | 52/64 |
| 2006/0117673 A1* | 6/2006 | McManus et al. | 52/67 |
| 2006/0254159 A1* | 11/2006 | Trautman et al. | 52/64 |
| 2007/0170740 A1* | 7/2007 | Di Franco | 296/26.13 |
| 2009/0134663 A1* | 5/2009 | Hickam et al. | 296/171 |
| 2010/0269419 A1* | 10/2010 | Gyory et al. | 52/79.5 |
| 2012/0151851 A1* | 6/2012 | Cantin et al. | 52/79.5 |

* cited by examiner

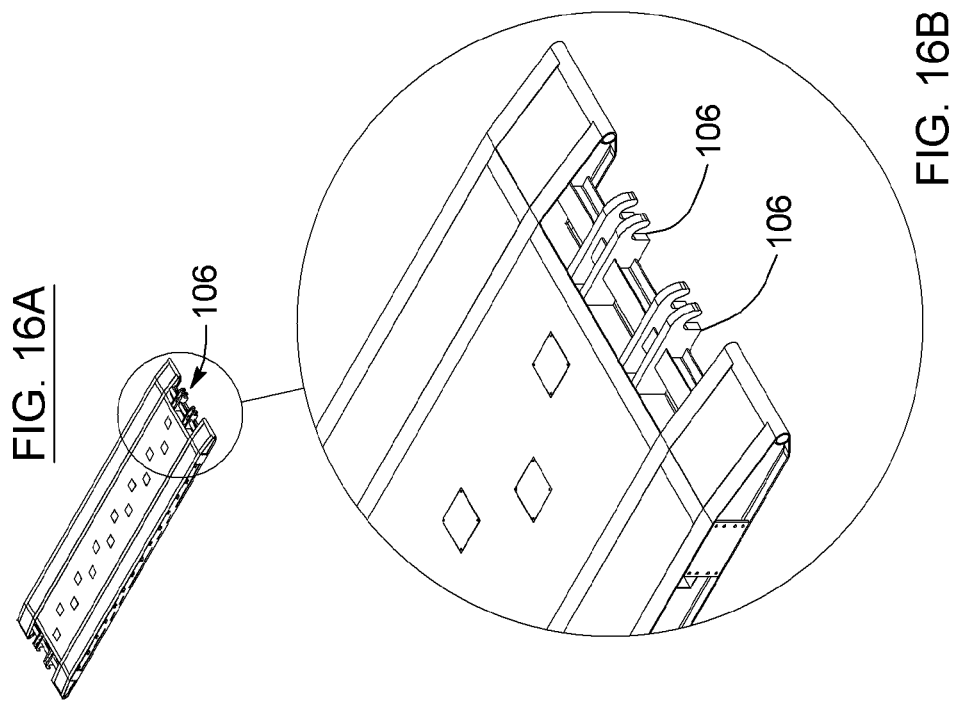
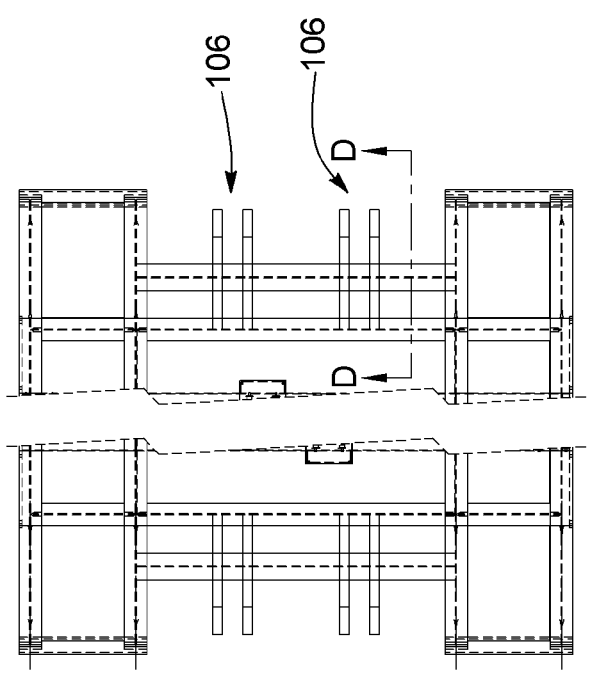
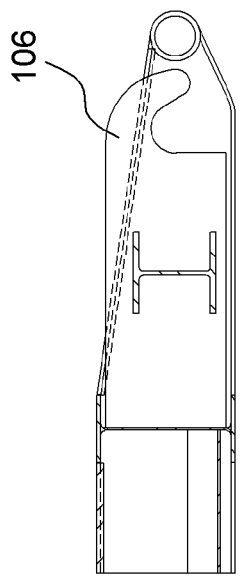

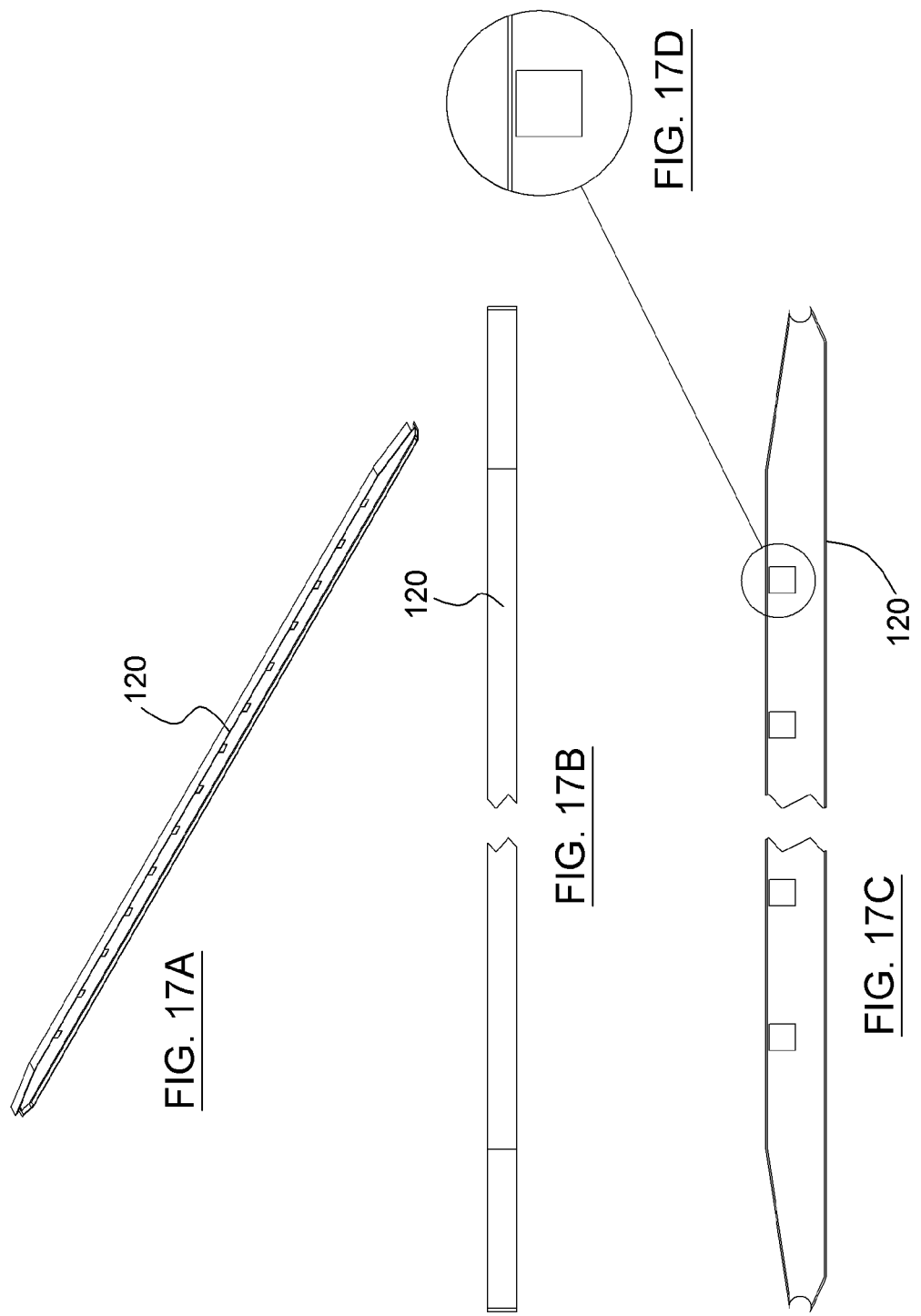

MOBILE MULTI-FUNCTIONAL SHELTER UNIT

CROSS-REFERENCE TO RELATED APPLICATIONS

This application claims priority to U.S. Provisional Application No. 61/244,107 filed Sep. 21, 2009. This application is hereby incorporated by reference in its entirety.

BACKGROUND OF THE INVENTION

1. Field of the Invention

The present invention generally relates to mobile shelters. More particularly, the present invention relates to a mobile multi-functional shelter unit for use as a portable working area and garage for heavy machinery. Other applications include but are not limited to mobile classrooms, mobile training facilities, mobile simulators, mobile dormers and mobile hospitals.

2. Description of the Related Art

The present invention relates to a mobile multi-functional shelter unit for use as an expandable/extendible working area. There are many designs for structures that can be used as mobile shelters but most are small in scale and do not readily accommodate the needs associated with the various other applications that such a shelter should have, such as the ability to maintain and store heavy machinery, to serve as a mobile classroom or training facility, to run simulators, as well as the ability to serve as a facility that would be available for use as a hospital or as a dormitory.

A few types of shelters are known to the applicant:

U.S. Pat. No. 2,765,499 discloses a collapsible but having a roof that lifts on four hydraulic jacks. This roof is supported by two long beams which can also be used as support for a crane bridge. The hut, supported on wheels or on skids, has large doors at both ends and can be used as a welding shop or a hospital.

U.S. Pat. No. 3,308,845 discloses a mobile service station having a ramp to wheel a vehicle inside. The roof to the trailer is expandable and the side wings are extendible. A compressor and gas tank are carried on the frame of the truck.

U.S. Pat. Nos. 3,505,767; 3,645,559; and 7,112,029 all disclose methods for transporting a building on a frame, using detachable gooseneck devices at the front and at the back of the frame.

U.S. Pat. No. 4,746,260 discloses a trailer for transporting a railway car. The trailer has a detachable front portion and a rear bogey. The rear bogey has an engine and a hydraulic pump is mounted on it. The rear bogey can also move independently of the front portion because of the hitch that is provided.

U.S. Pat. No. 6,296,028 discloses a mobile oil change trailer where the floor has a reservoir built in it.

U.S. Pat. No. 6,712,414 discloses an expandable structure with a raisable roof and slide-out wings that move on guide rails.

Therefore, there is still presently a need for a mobile multi-functional shelter unit, for use as a general working area (for example, as a classroom, training facility, hospital, dormitory, simulator) or a garage that can accommodate heavy machinery, which is easily transportable, ecological, safe for workers and quickly expandable.

SUMMARY OF THE INVENTION

An object of the present invention is to provide a mobile multi-functional shelter unit that satisfies the above mentioned need.

Accordingly, the present invention provides a mobile multi-functional shelter unit comprising:
 a central structure, the central structure comprising:
  a base section comprising:
   first and second opposite longitudinal sides;
   first and second opposite extremity ends;
   meeting points between each opposite longitudinal sides and each adjacent extremity end defined as lower meeting points; and
   a central floor mounted on top of the base section;
  a frame section mounted on the base section comprising:
   a bottom portion comprising:
    bars having a top end and a bottom end vertically mounted from the bottom end to each lower meeting point defining opposite longitudinal side sections of the frame and opposite front and back sections of the frame; and
   a top portion comprising:
    upright beams mounted longitudinally to the top ends of the bars forming a support mount;
  a raisable roof assembly mounted on the support mount and comprising:
   beams raisably mounted to the support mount for supporting translation of the roof assembly from a lowered position to an elevated extended position;
   a roof section mounted on top of said beams comprising:
    opposite long sides forming opposite sidewalls comprising an upper section and a lower section;
    opposite short sides comprising an upper section and a lower section;
    a roof panel mounted onto the upper section of the sidewalls and the upper section of the short sides; and
   a roof deployment system engaging said sidewalls and said short sides to concurrently elevate together translating the roof assembly between the lowered position and the elevated extended position; and
  a pullout assembly expandedly mounted on pullout slider beams affixed to each opposite longitudinal side of the base section of the central structure, the pullout assembly comprising a pullout assembly deployment system for translating the pullout assembly between a retracted state, positioned inside the central structure, and an expanded state projecting from the central structure.

BRIEF DESCRIPTION OF THE DRAWINGS

These and other objects and advantages of the invention will become apparent upon reading the detailed description and upon referring to the drawings in which:

FIGS. 16A to 16D are perspective, detailed, partial top and partial side views respectively of a base section according to a preferred embodiment of the present invention;

FIGS. 17A to 17D are perspective, top, side and detailed side views respectively of main beam of the base section according to a preferred embodiment of the present invention.

DETAILED DESCRIPTION OF PREFERRED EMBODIMENTS

Figure 1:
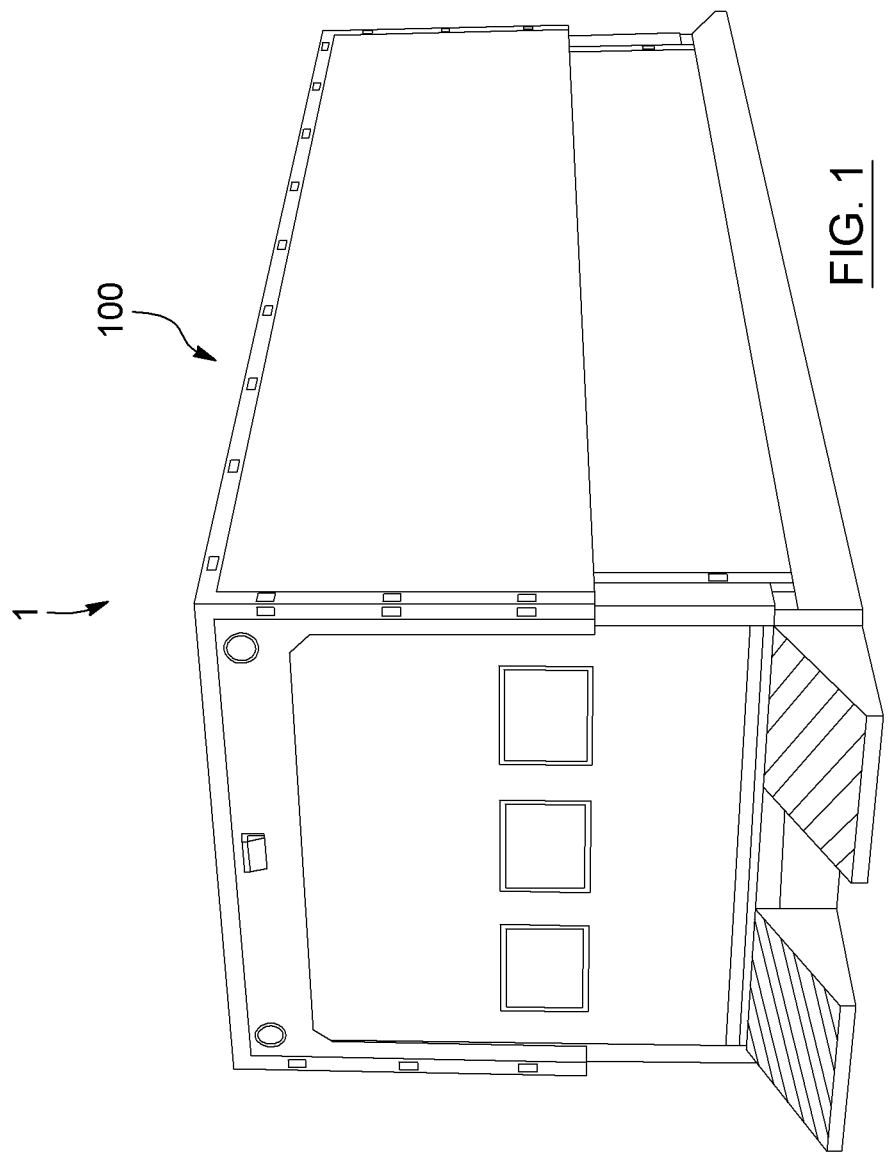
FIG. 1 is a perspective view of the central structure in a non-deployed state according to a preferred embodiment of the present invention.
Figure 3:
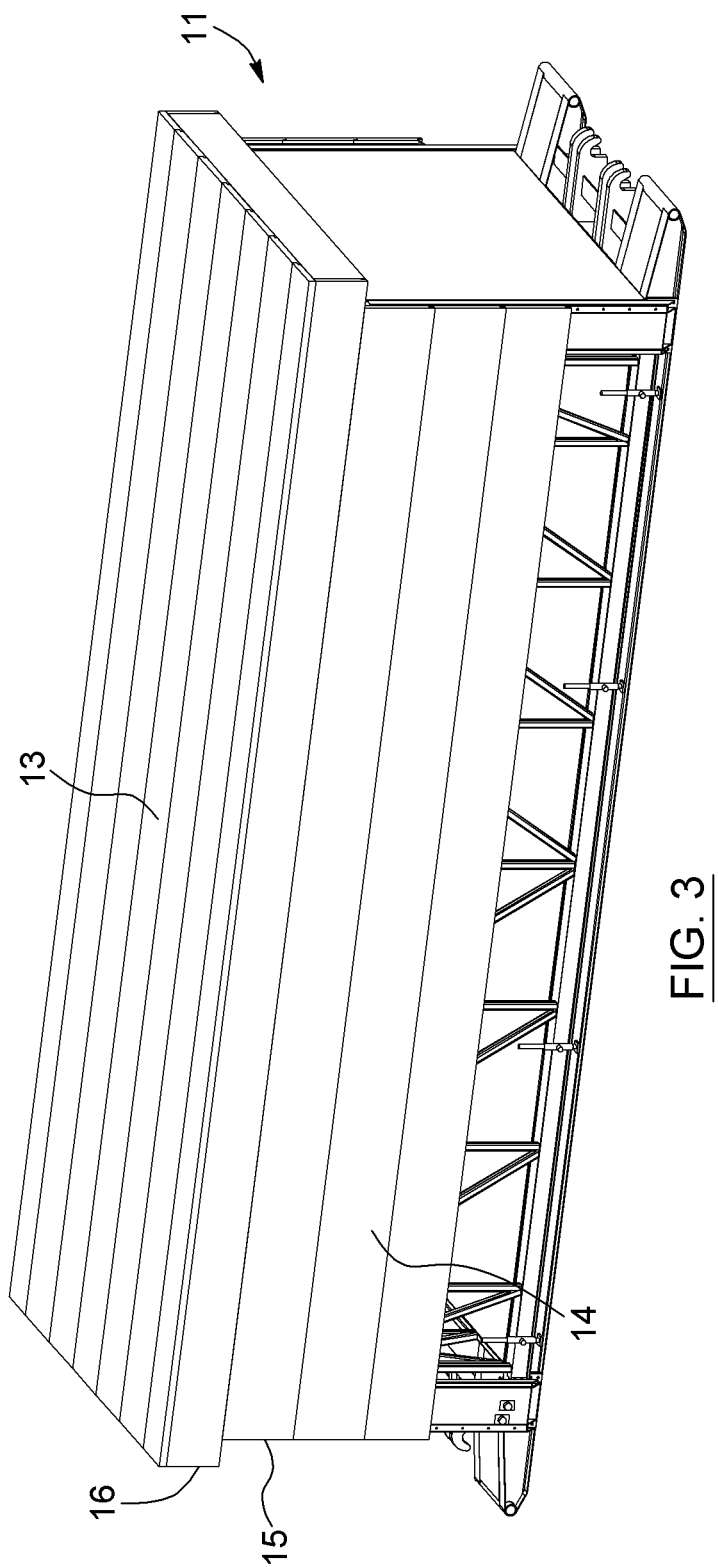
FIG. 3 is a perspective view of the base section illustrating how the raisable roof assembly is mounted onto the frame section according to a preferred embodiment of the present invention.
Figure 4:
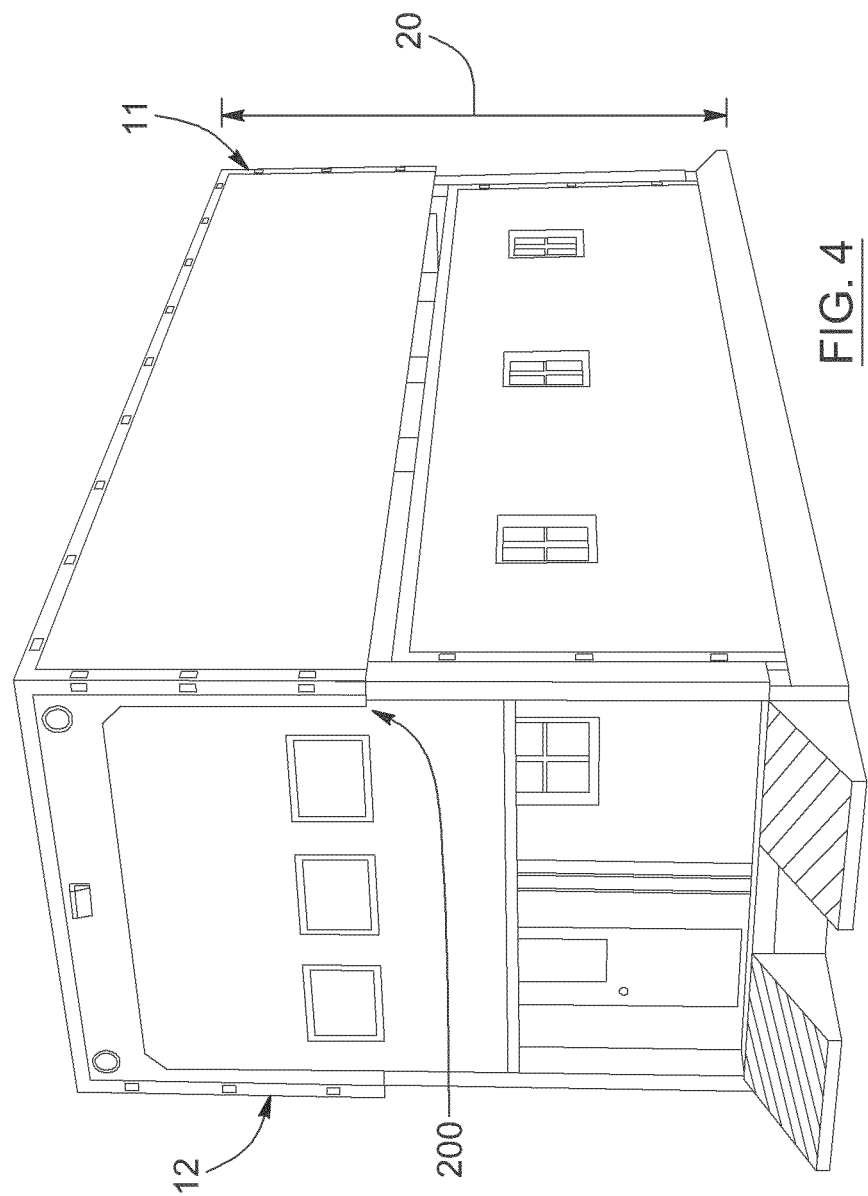
FIG. 4 is a perspective view of the central structure illustrating the raisable roof assembly in its extended state according to a preferred embodiment of the present invention.
Figure 5:
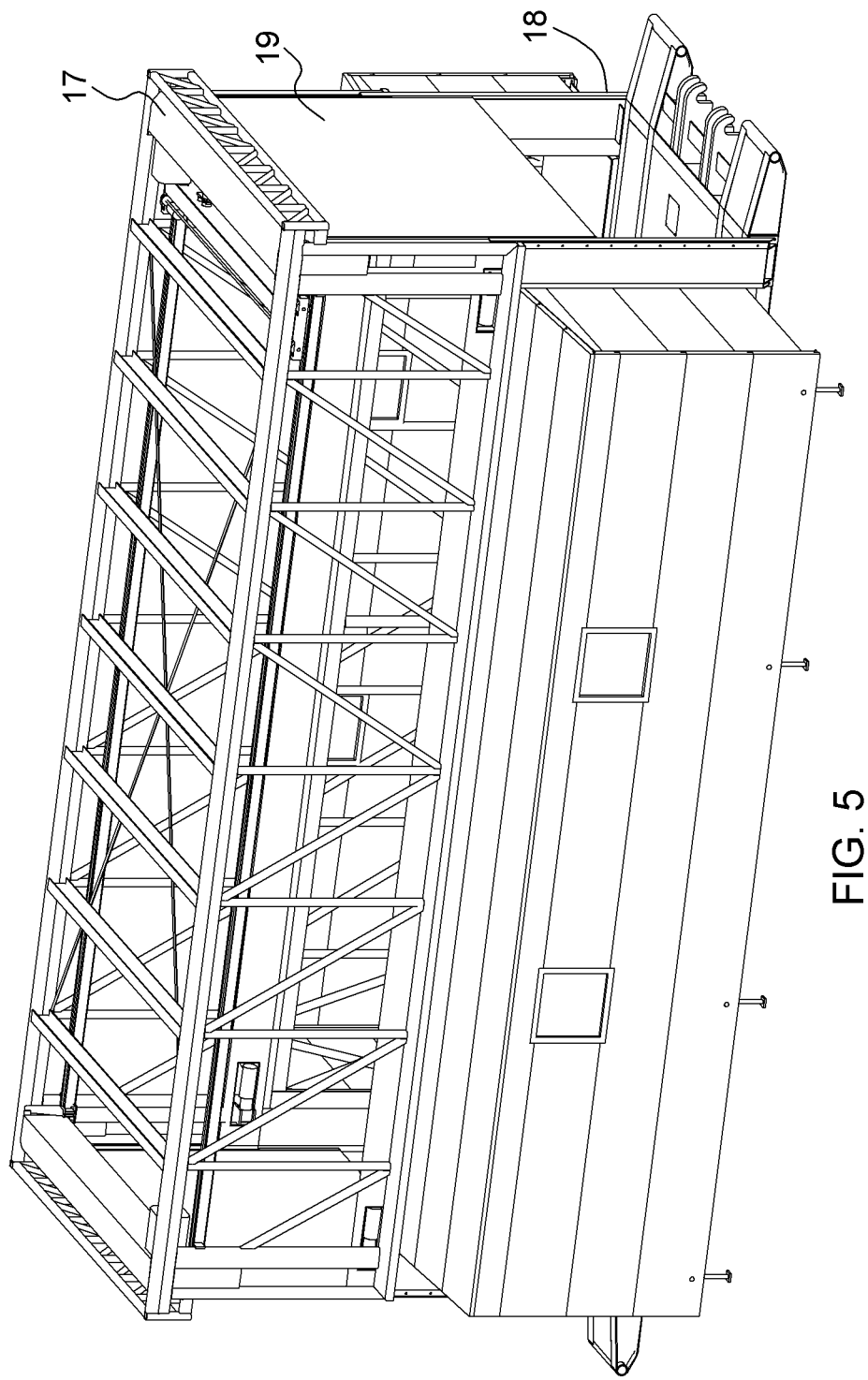
FIG. 5 is a perspective view of the central structure illustrating the roof section in its extended state, the pullout assembly in its expanded state and the door in between its up position and its down position according to a preferred embodiment of the present invention.

As shown in FIGS. 1 to 9, the present invention provides a mobile multi-functional shelter unit 100. The mobile multi-functional shelter unit 100 includes a central structure 1 configurable between a non-deployed state, as shown in FIG. 1 and a deployed state (as shown in FIG. 5) with means for translating from the non-deployed state to the deployed state.

Figure 2:
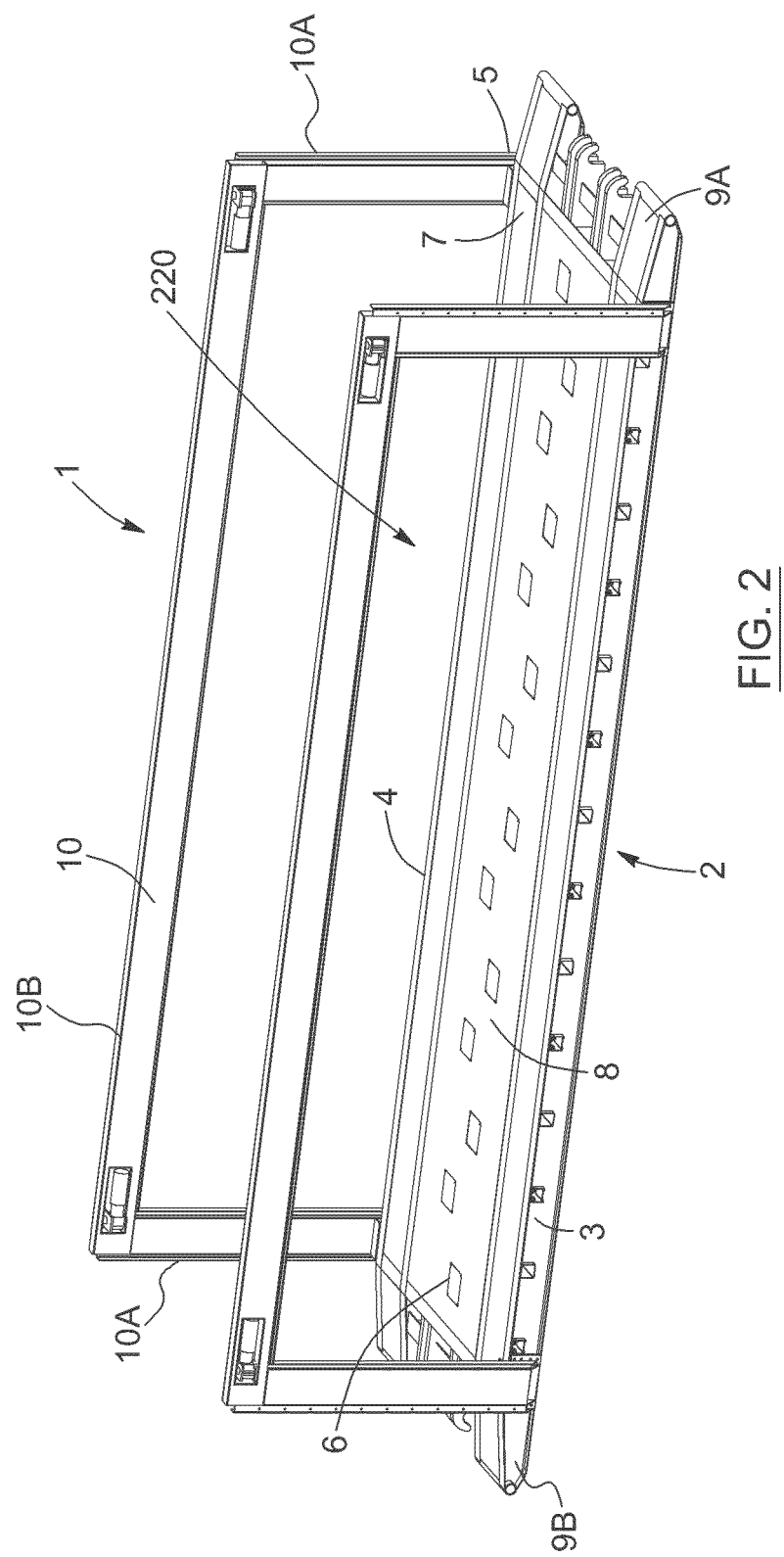
FIG. 2 is a perspective view of the base section and the frame section according to a preferred embodiment of the present invention.

As better shown in FIG. 2, the central structure 1 also includes a base section 2 comprising first 3 and second 4 opposite longitudinal sides, first 5 and second 6 opposite extremity ends, and meeting points between each opposing longitudinal sides and each adjacent extremity end defined as lower meeting points 7. The central structure also has a central floor 8 mounted on top of the base section 2.

Also shown in FIG. 2, the central structure 1 includes a frame section 10 mounted on the base section 2. The frame section 10 has a bottom part with bars 10A having a top end and a bottom end vertically mounted from the bottom end to each lower meeting point defining opposing longitudinal side sections of the frame and opposing front and back sections of the frame. The frame section also has a top part having upright beams 10B mounted longitudinally to the top ends of the flat bars 10A forming a support mount for a raisable roof assembly.

As better shown in FIGS. 3 and 4, the central structure 1 also includes a raisable roof assembly 11 comprising beams 12 raisably mounted to the support mount for translating the roof assembly 11 from a lowered position to an elevated extended position (as shown in FIG. 4).

As better shown in FIG. 3, the roof assembly 11 also includes a roof section 13 mounted on top of the beams 12 and comprises opposing long sides forming opposing sidewalls 14 having an upper section and a lower section, opposing short sides 15 having an upper section and a lower section, a roof panel 16 mounted onto the upper section of the sidewalls and the upper section of the short sides.

As better shown in FIG. 4, the central structure 1 also includes a roof deployment system 200 engaging the sidewalls and the short sides to concurrently elevate together bringing the roof assembly from a lowered position to an extended position 20, a volume between the roof assembly and the central floor and the frame defining a central cavity.

Figure 6:
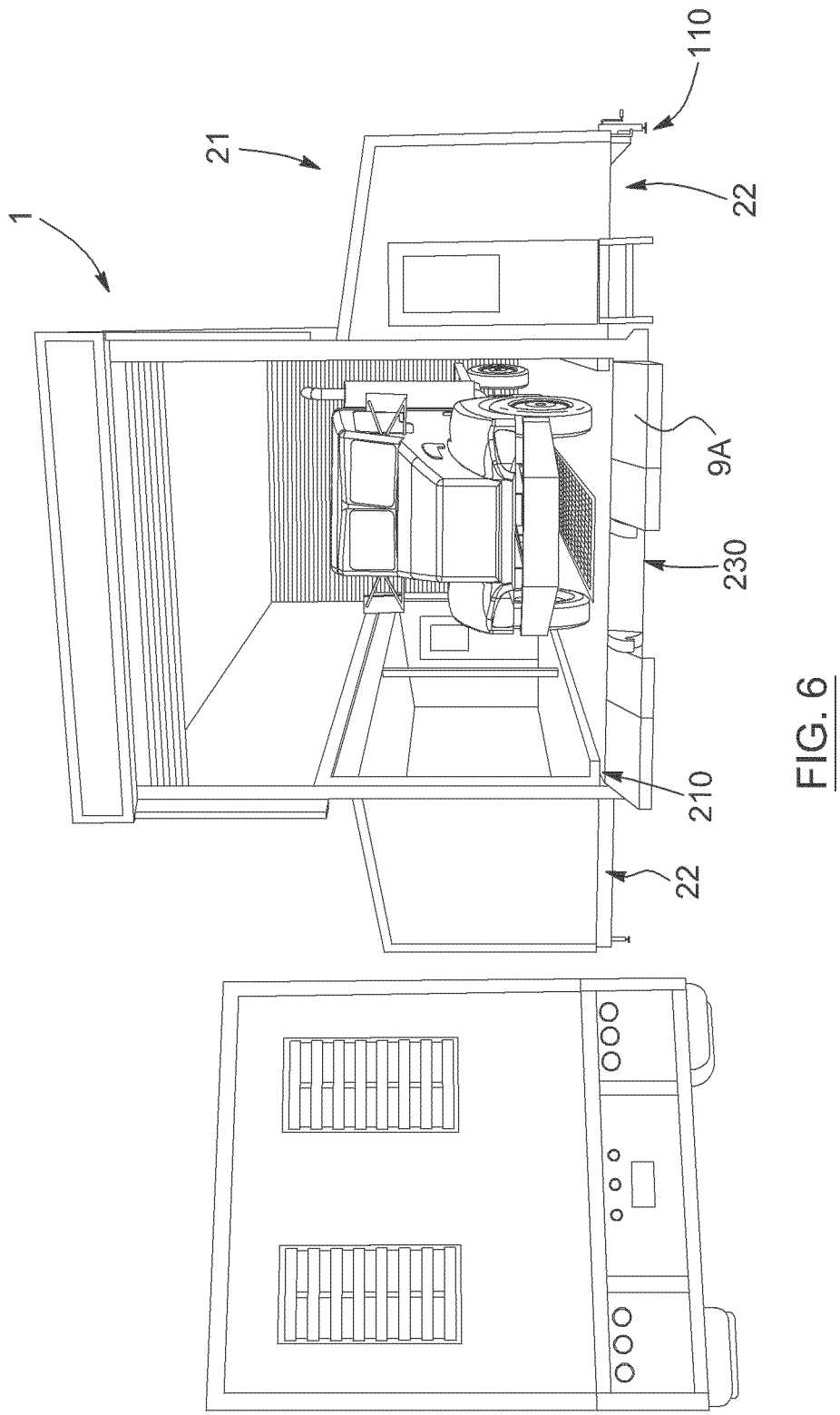
FIG. 6 is a front view of the central structure in its deployed state illustrating heavy machinery entering the central cavity from one extremity end and an accessory power system according to a preferred embodiment of the present invention.

As shown in FIG. 6, the central structure 1 includes a pullout assembly 21 expandedly mounted on pullout slider beams 22 affixed to each opposing longitudinal side of the base section of the central structure 1. The pullout assembly 21 comprises a pullout assembly deployment system 210 for translating the pullout assembly 21 between a retracted state, positioned inside the central structure 1, and an expanded state projecting from the central structure 1.

Preferably, as shown in FIG. 2, the shelter unit 100 comprises an ascending ramp 9A supported on the first opposite extremity end of the base section 2, the ascending ramp 9A being adapted to raise a vehicle from a ground surface onto the central floor at the first opposite extremity end of the base section.

Preferably, the shelter unit 100 further comprises a descending ramp 9B supported on the second opposite extremity end of the base section, the descending ramp being adapted to lower the vehicle from the central floor to the ground surface at the second opposite extremity end of the base section. The ascending ramp, the base section and the descending ramp form an integral rail assembly 220 supporting the vehicle during a displacement of the vehicle through the shelter unit 100.

Preferably, as shown in FIG. 5, the roof assembly 11 further comprises at least one door assembly 17 with guides 18 on each opposite lower section of at least one of the short sides of the roof section. The door assembly 17 comprises a door 19 moveably mounted on the roof assembly 11 and a door positioning adjustment system for positioning the door 19 between an up position to a down position. In the down position, the door 19 is in contact with a corresponding opposite extremity end of the base section 2.

Preferably, the door 19 is a sectional door sized to close openings formed at an end of the shelter unit when the roof assembly is positioned at both the lowered position and the elevated extended position.

Figure 7:
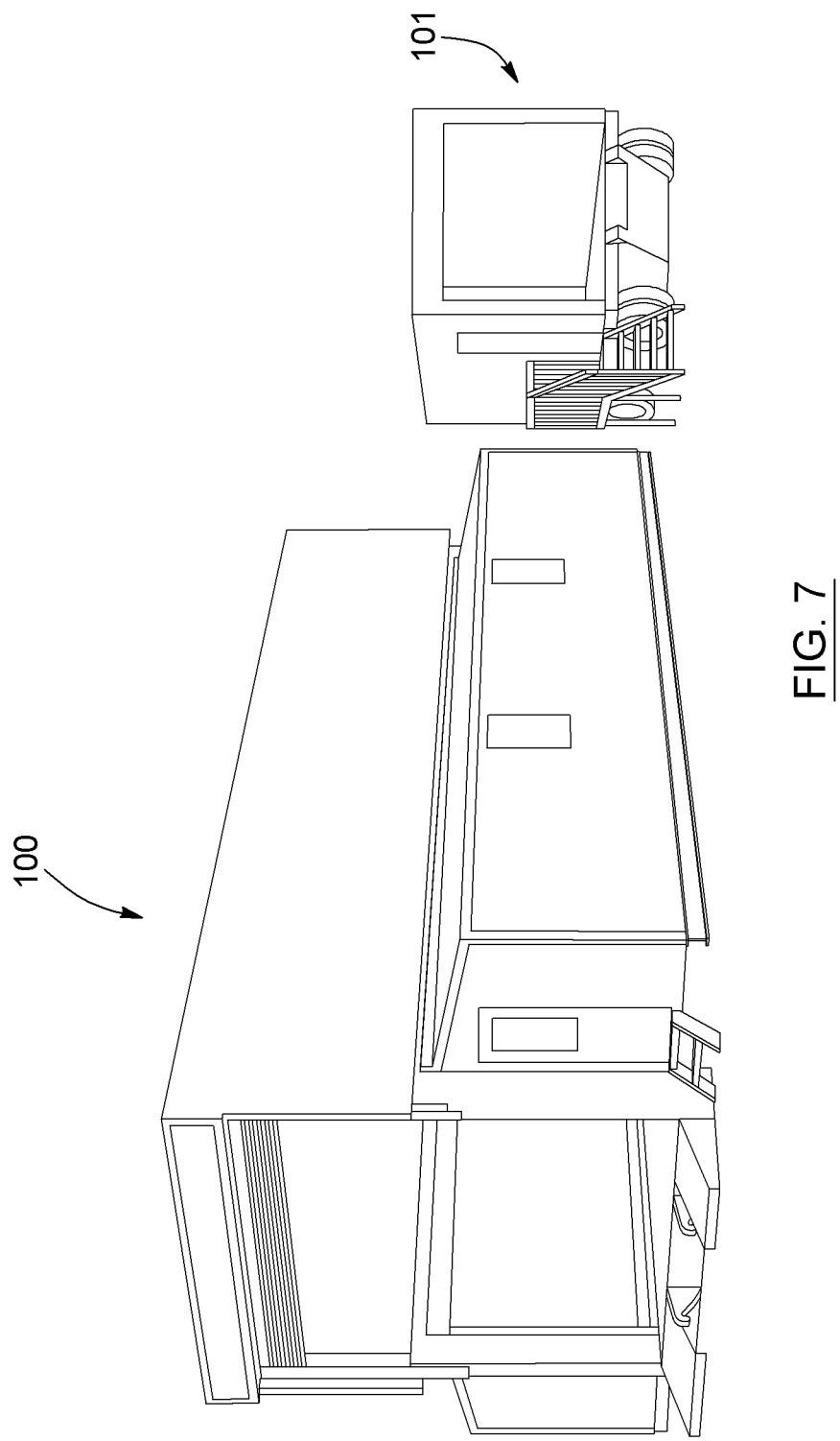
FIG. 7 is a perspective view of the central structure in its deployed state illustrating the roof assembly in its extended state, the pullout assembly in its expanded state and the door in its up position, with an accessory power system according to another preferred embodiment of the present invention.
Figure 8:
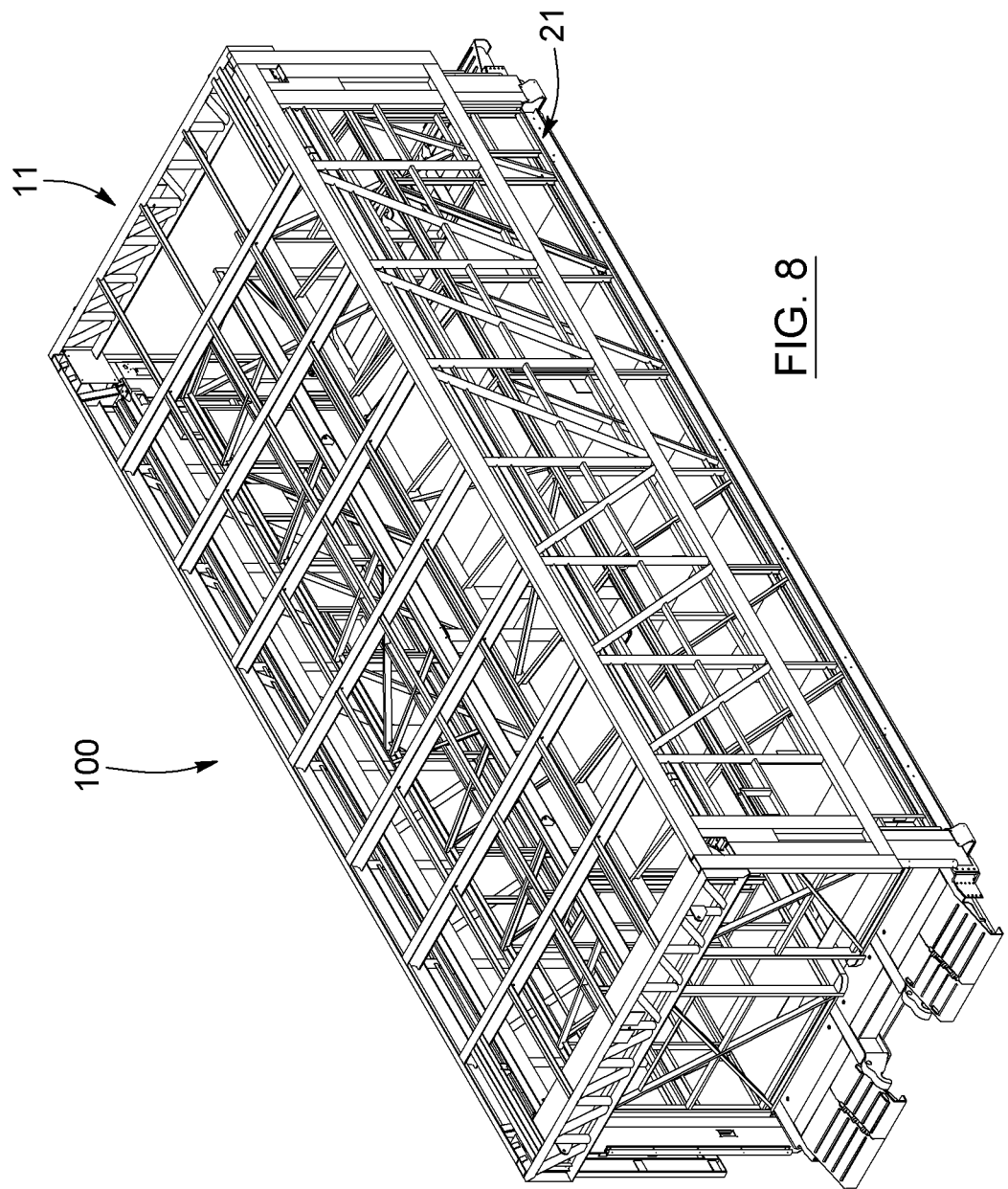
FIG. 8 is a perspective view of the central structure in a non-deployed state, illustrating the roof assembly in a lowered state, and the pullout assembly in a retracted state, according to another preferred embodiment of the present invention.
Figure 9:
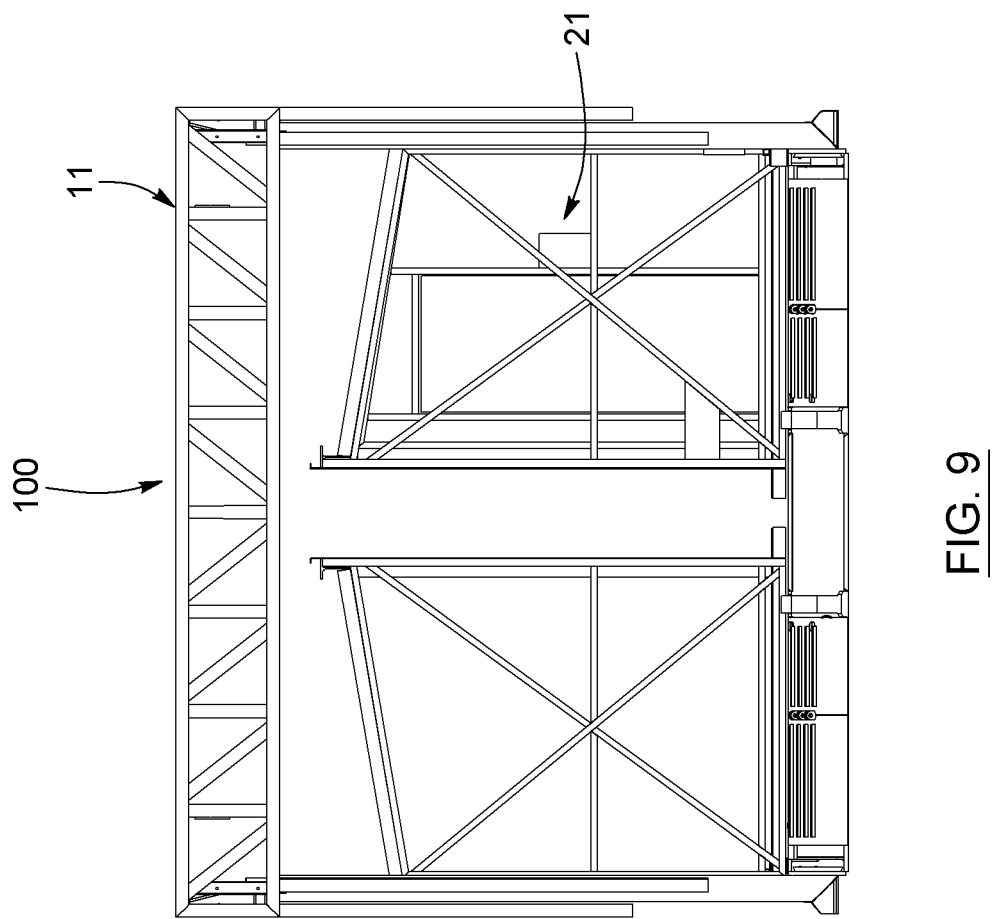
FIG. 9 is a front view of the central structure shown in FIG. 8.
Figure 10:
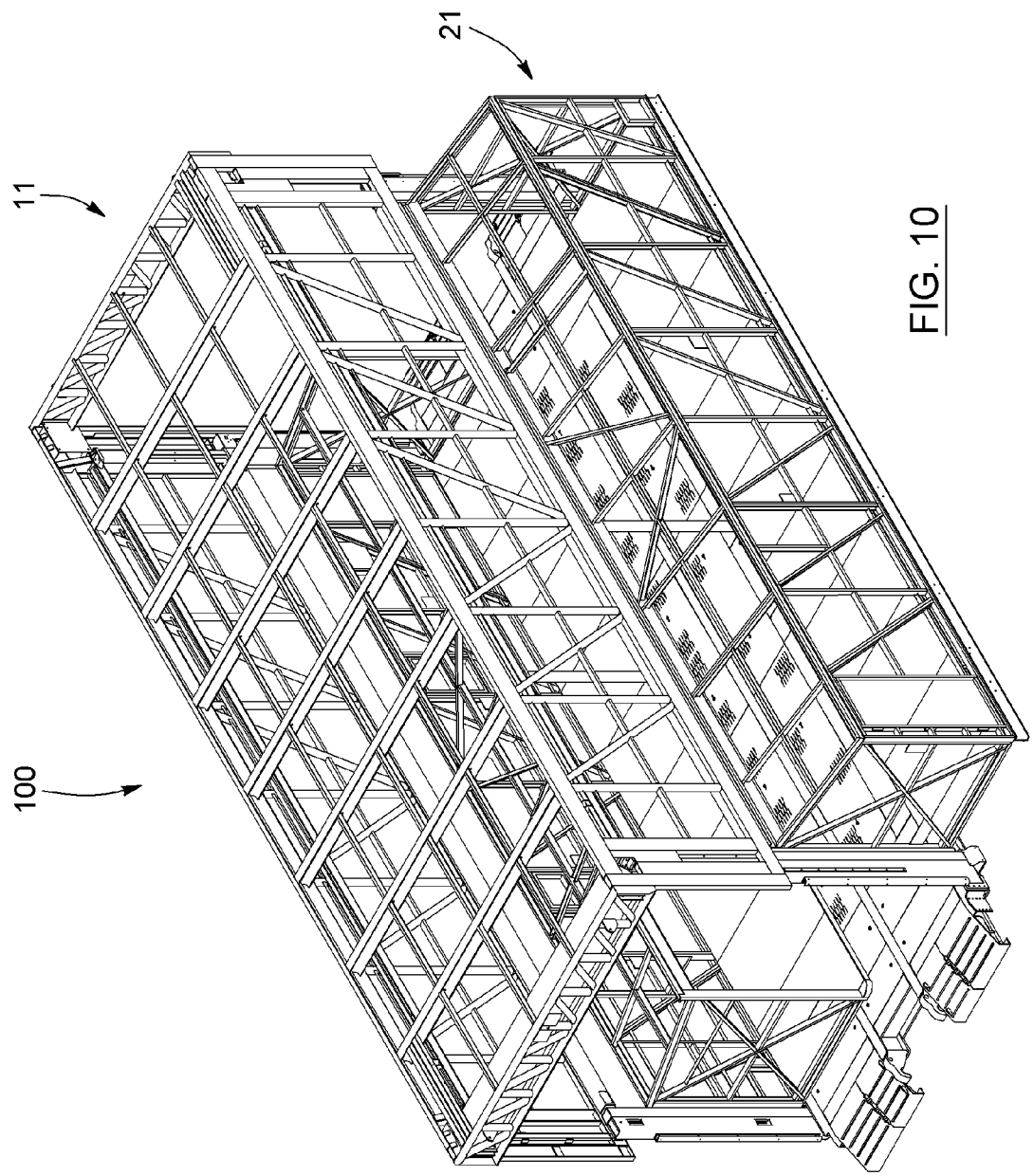
FIG. 10 is a perspective view of the central structure shown in FIG. 8, in a partially-deployed state, illustrating the roof assembly in an elevated state, and the pullout assembly in a partially expanded state.
Figure 11:
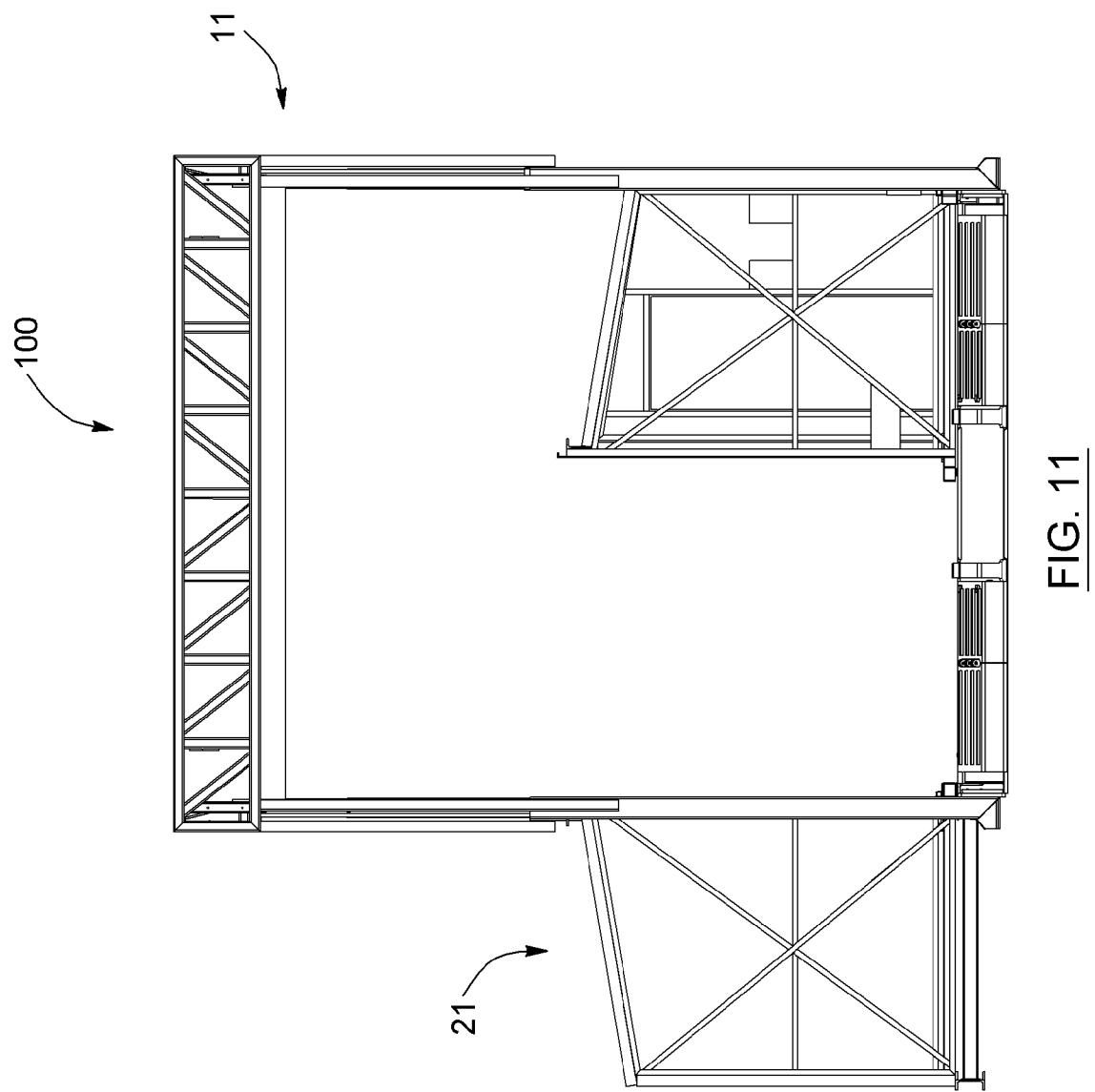
FIG. 11 is a front view of the central structure shown in FIG. 10.
Figure 12:
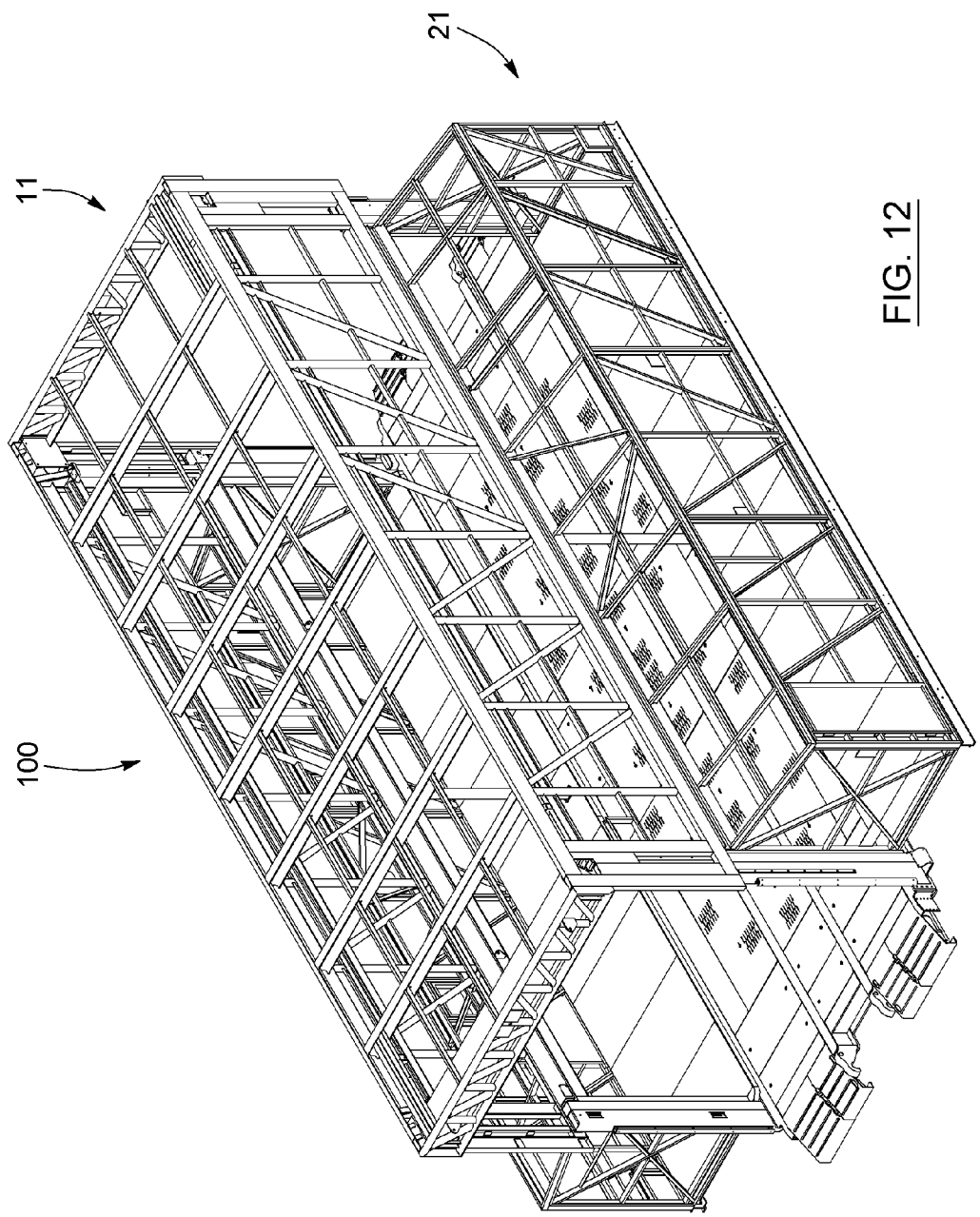
FIG. 12 is a perspective view of the central structure shown in FIG. 8, in a deployed state, illustrating the roof assembly in an elevated state, and the pullout assembly in an expanded state.
Figure 13:
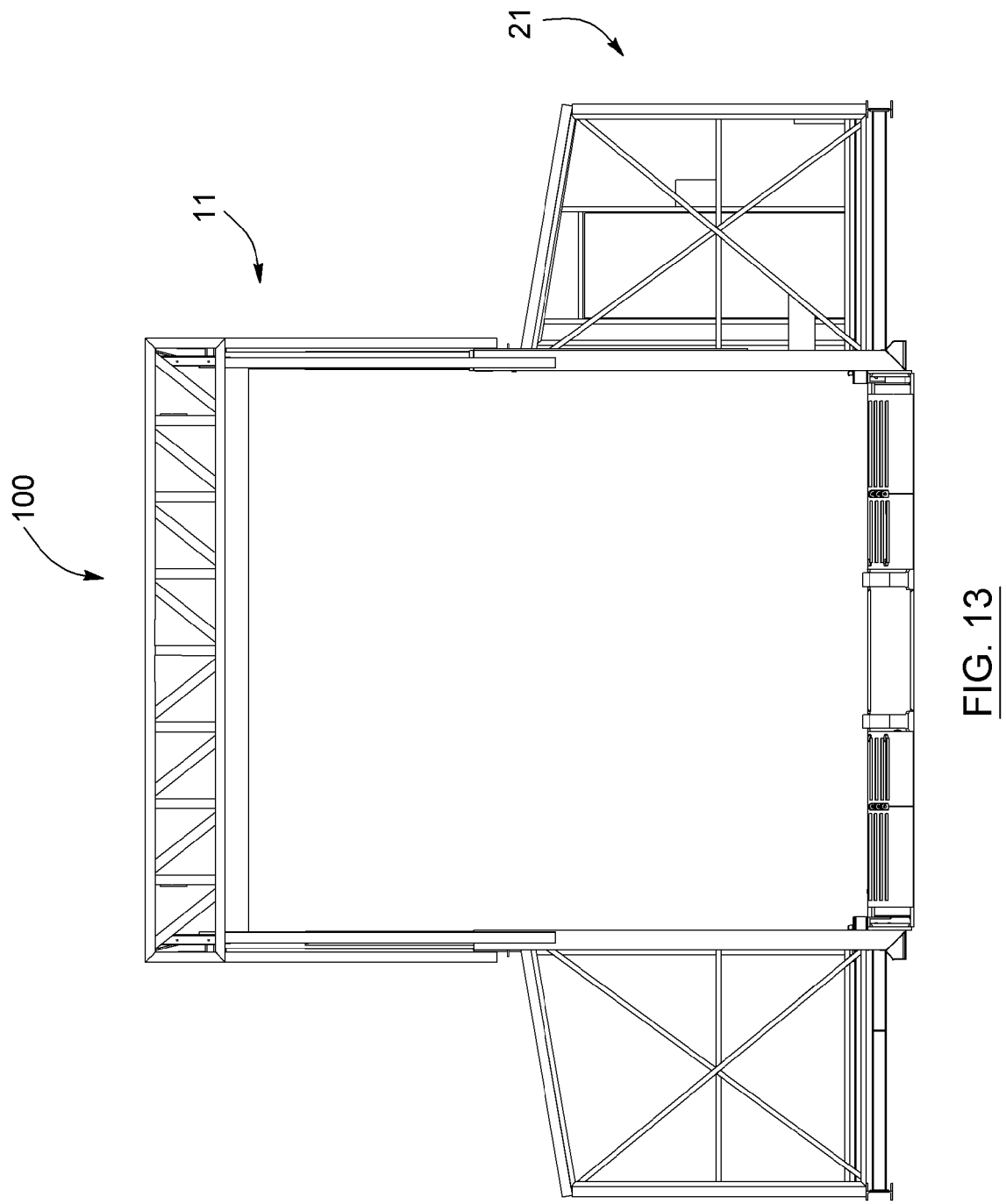
FIG. 13 is a front view of the central structure shown in FIG. 12.

Preferably, as shown in FIG. 7, the shelter unit 100 further comprises a power system 101 for powering the central structure 1.

FIGS. 8 to 13 illustrate a typical deployment sequence for the shelter unit, illustrating in particular the deployment of the roof assembly and the pullout assembly.

Figure 14:
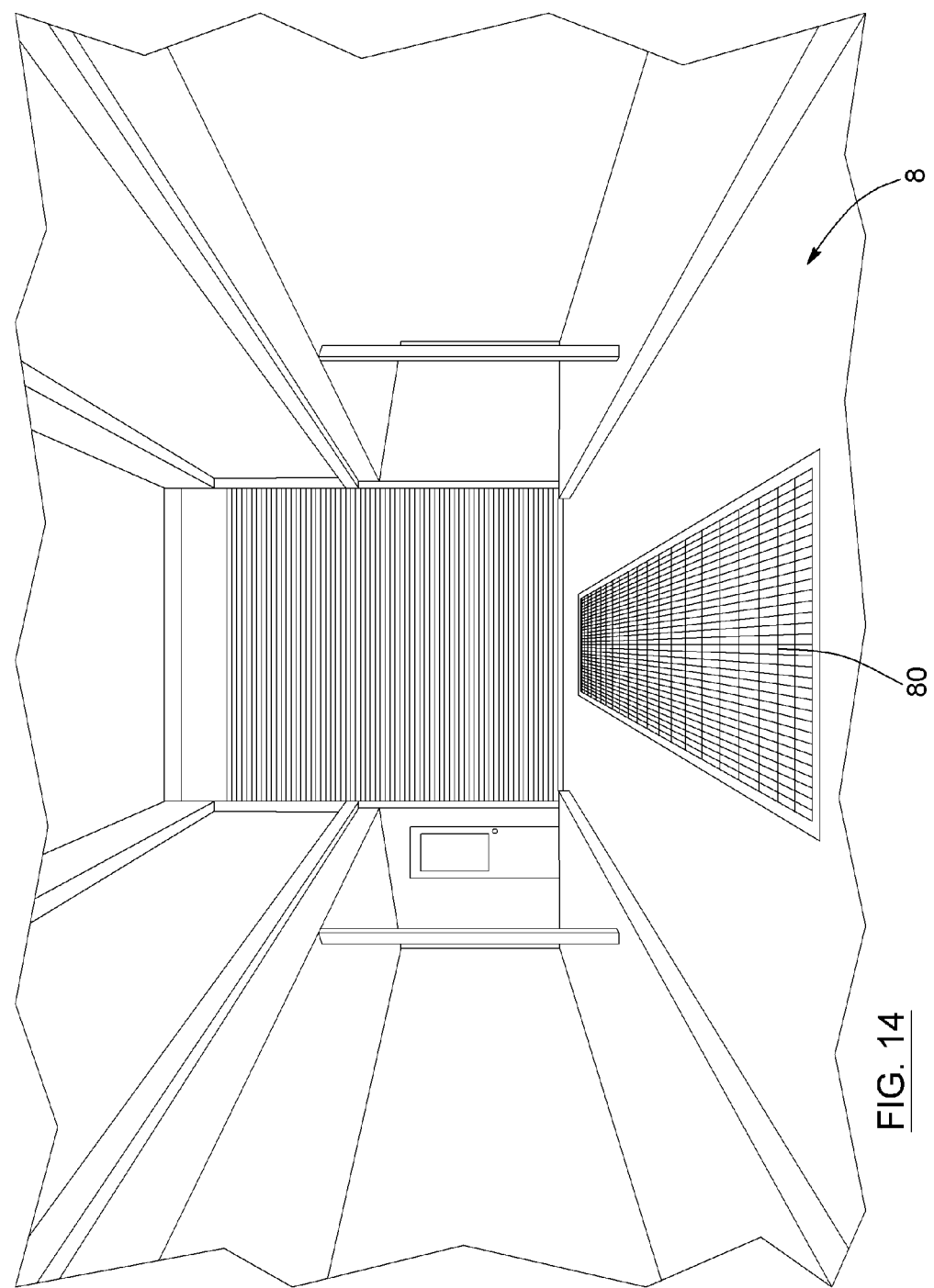
FIG. 14 is an interior perspective view of a shelter unit according to another preferred embodiment of the present invention.

Preferably, as better shown in FIG. 14, the central floor 8 comprises at least one aperture 80 and the shelter unit further comprises a reservoir 230 positioned under the central floor 8 for receiving materials traversing the central floor 8 through the at least one aperture 80. This feature is useful if the shelter unit 100 is to be used as a wash bay.

Preferably, as shown in FIG. 6, the shelter unit 100 further comprises an outrigger system 110 for supporting the pullout assembly 21 in the expanded state with respect to a ground surface.

Figure 15:
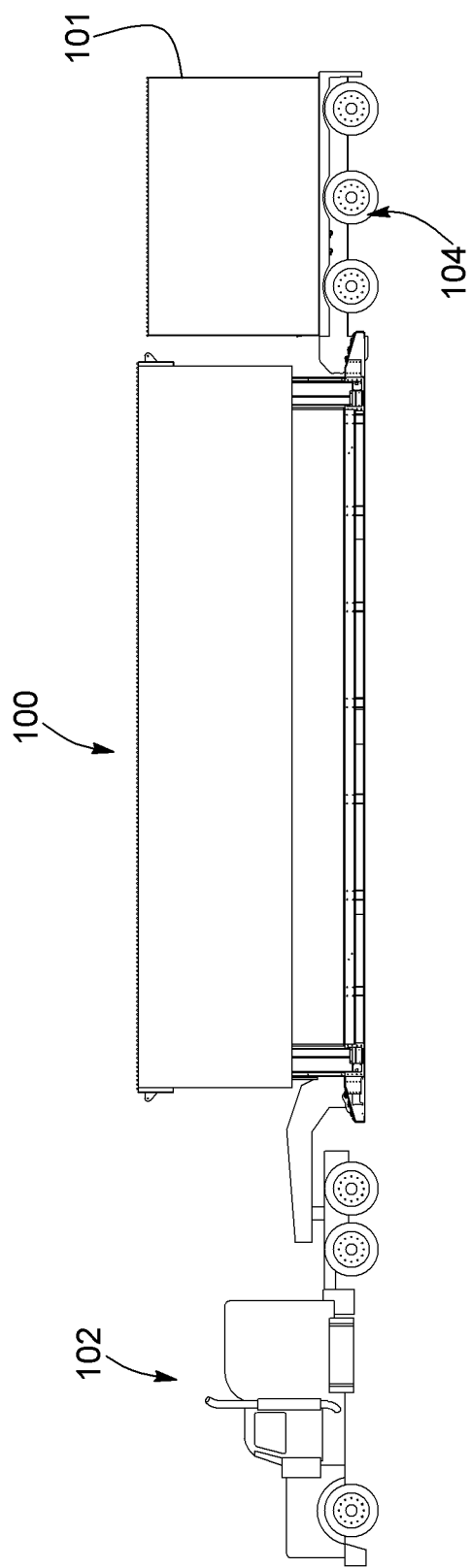
FIG. 15 is a side view of the central structure and the power system mounted onto a powered vehicle according to another preferred embodiment of the present invention.

Preferably, as shown in FIG. 15, the shelter unit 100 further comprises a powered vehicle 102 for providing displacement of the central structure 1, and the power system 101 is mounted on a wheeled trailer 104. As shown in FIGS. 16A to 16B the central structure further comprises front and rear vehicle attachment interfaces 106. Thus, the central structure 1 is suspendable through the attachment interfaces 106 between the powered vehicle 102 and the wheeled trailer 104.

FIGS. 17A to 17D are perspective, top, side and detailed side views respectively of a main beam 120 of the base section 2 according to a preferred embodiment of the present invention. The minimum dimensions illustrated for the main beam 120, preferably made of W44 steel, allow the base section 2 to support much heavier vehicles than prior art shelter units.

One application of the present invention, among others, is to provide a combined garage and wash bay. The unique demands of oil and gas production require a one-of-a-kind solution that saves both time and money. The combined garage and wash bay is a versatile portable building with many applications, ranging from a temperature controlled working area to an environmentally friendly wash bay.

The shelter unit in this application has no hydraulic system and functions with electrical and air systems. Preferably, the indoor facility is also a portable building with a four-ton overhead crane.

Preferably, the shelter unit is transported by truck and spans 30 feet wide, 40 feet long, and 20 feet high when opened. Set-up and removal is easy: one truck, one person, one hour are required. Users can benefit from the unique design of the floor as a tank, as well as the unit's rigidity and robustness.

Preferably, the shelter unit comes with a floor that can support 90,000 pounds, a four-ton overhead crane, and an Insulated, heated facility with a generator that makes the building self-sufficient.

The shelter unit can help businesses operate more efficiently and thrive in harsh environments, while at the same time protect the environment and prevent cross-contamination challenges. Clients can also ensure productivity in the worst conditions. During winter, mechanics working without the shelter unit can spend as much as 30 minutes out of an hour simply warming up.

The shelter unit according to the present invention can also help respond to another dilemma faced by clients: stricter government enforcement of mandatory spotless wash regulations. For example there is sometimes a need to haul heavy equipment 250 kilometers from one site to head office to be cleaned, before transporting the equipment to a different work location, only 50 kilometers away from the original site. By combining the garage and wash bay as a unit, companies will now be able not only to do mechanical work and/or welding, but they will also have the option of cleaning their equipment right on site.

The shelter unit according to the present invention offers the following advantages and optional features:

Rapid and easy mounting/dismounting—as it can be accomplished with one truck, one person, in one hour;

A wash bay can be provided to keep equipment clean and prevent costly cross-contamination problems;

Insulated walls, for a more comfortable working area can be provided;

An environmentally friendly design can be provided with a tank built as a floor, to capture any liquid spills that would otherwise damage the environment;

Two 14-foot by 16-foot overhead doors (one at each end) can be provided;

Optional items, can include attached tool boxes, attached work tables, welding equipment, and much more;

A standard air compressor system can be provided with the shelter unit;

An optional security camera system can also be provided;

A diesel generator (50 kW, 3 phase) can be included to power the facility;

The shelter unit is a structure whose high-quality design makes it versatile, durable, and portable;

Major benefits of the shelter system may also include:

Greatly reduced equipment downtime, by having mechanics and equipment readily available for certain applications;

A major reduction in transportation for out-of-order equipment;

The floor built as a tank will drastically lower the risk of oil and gas spills;

Increased staff morale and productivity, with a working environment that can be adjusted to provide relief from outdoor conditions As mentioned above, other applications of the shelter unit include but are not limited to providing mobile classrooms, mobile training facilities, mobile simulators, mobile dormers and mobile hospitals.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is being claimed is:

1. A mobile multi-functional shelter unit comprising:
a central structure, said central structure comprising:
    a base section comprising:
        first and second opposite longitudinal sides;
        first and second opposite extremity ends;
        meeting points between each opposite longitudinal sides and each adjacent extremity end defined as lower meeting points; and
        a central floor mounted on top of the base section;
    a frame section mounted on said base section comprising:
        a bottom portion comprising:
            bars having a top end and a bottom end vertically mounted from the bottom end to each lower meeting point defining opposite longitudinal side sections of the frame and opposite front and back sections of the frame; and
        a top portion comprising:
            upright beams mounted longitudinally to the top ends of said bars forming a support mount;
    a raisable roof assembly mounted on the support mount and comprising:
        beams raisably mounted to the support mount for supporting translation of the roof assembly from a lowered position to an elevated extended position;
        a roof section mounted on top of said beams comprising:
            opposite long sides forming opposite sidewalls comprising an upper section and a lower section;

opposite short sides comprising an upper section and a lower section; and
a roof panel mounted onto the upper section of the sidewalls and the upper section of the short sides;
a roof deployment system engaging said sidewalls and said short sides to concurrently elevate together translating the roof assembly between the lowered position and the elevated extended position; and
at least one door assembly with guides on each opposite lower section of at least one of the short sides of the roof section, said door assembly comprising:
a door moveably mounted on the roof assembly; and
a door positioning adjustment system for positioning the door between an up position and a down position,
wherein, in the down position, the door is in contact with a corresponding opposite extremity end of the base section; and
a pullout assembly expandedly mounted on pullout slider beams affixed to each opposite longitudinal side of the base section of the central structure, said pullout assembly comprising a pullout assembly deployment system for translating the pullout assembly between a retracted state, positioned inside said central structure, and an expanded state projecting from said central structure.

2. The mobile multi-functional shelter unit of claim 1, further comprising an ascending ramp supported on the first opposite extremity end of said base section, said ascending ramp being adapted to raise a client vehicle from a ground surface onto said central floor at the first opposite extremity end of said base section.

3. The mobile multi-functional shelter unit of claim 2, further comprising a descending ramp supported on the second opposite extremity end of said base section, said descending ramp being adapted to lower the client vehicle from the central floor to the ground surface at the second opposite extremity end of said base section.

4. The mobile multi-functional shelter unit of claim 3, wherein the ascending ramp, the base section and the descending ramp form an integral rail assembly supporting the vehicle during a displacement of the client vehicle through the shelter unit.

5. The mobile multi-functional shelter unit of claim 4, further comprising a power system for powering said central structure.

6. The mobile multi-functional shelter unit of claim 4, wherein the central floor comprises at least one aperture and the shelter unit further comprises a reservoir positioned under the central floor for receiving materials traversing the central floor through the at least one aperture.

7. The mobile multi-functional shelter unit of claim 4, further comprising an outrigger system for supporting the pullout assembly in the expanded state with respect to a ground surface.

8. The mobile multi-functional shelter unit of claim 1, further comprising a power system for powering said central structure.

9. The mobile multi-functional shelter unit of claim 8, wherein the shelter unit further comprises a powered vehicle for providing displacement of the central structure, the power system is mounted on a wheeled trailer, the central structure further comprises front and rear vehicle attachment interfaces, and the central structure is suspendable through said attachment interfaces between the powered vehicle and the wheeled trailer.

10. The mobile multi-functional shelter unit of claim 8, wherein the central floor comprises at least one aperture and the shelter unit further comprises a reservoir positioned under the central floor for receiving materials traversing the central floor through the at least one aperture.

11. The mobile multi-functional shelter unit of claim 10, wherein the shelter unit further comprises a powered vehicle for providing displacement of the central structure, the power system is mounted on a wheeled trailer, the central structure further comprises front and rear vehicle attachment interfaces, and the central structure is suspendable through said attachment interfaces between the powered vehicle and the wheeled trailer.

12. The mobile multi-functional shelter unit of claim 1, wherein the door is a sectional door sized to close openings formed at an end of the shelter unit when the roof assembly is positioned at both the lowered position and the elevated extended position.

13. The mobile multi-functional shelter unit of claim 1, wherein the central floor comprises at least one aperture and the shelter unit further comprises a reservoir positioned under the central floor for receiving materials traversing the central floor through the at least one aperture.

14. The mobile multi-functional shelter unit of claim 1, further comprising an outrigger system for supporting the pullout assembly in the expanded state with respect to a ground surface.

15. A mobile multi-functional shelter unit comprising:
a central structure, said central structure comprising:
a base section comprising:
first and second opposite longitudinal sides;
first and second opposite extremity ends;
meeting points between each opposite longitudinal sides and each adjacent extremity end defined as lower meeting points; and
a central floor mounted on top of the base section;
a frame section mounted on said base section comprising:
a bottom portion comprising:
bars having a top end and a bottom end vertically mounted from the bottom end to each lower meeting point defining opposite longitudinal side sections of the frame and opposite front and back sections of the frame; and
a top portion comprising:
upright beams mounted longitudinally to the top ends of said bars forming a support mount;
a raisable roof assembly mounted on the support mount and comprising:
beams raisably mounted to the support mount for supporting translation of the roof assembly from a lowered position to an elevated extended position;
a roof section mounted on top of said beams comprising:
opposite long sides forming opposite sidewalls comprising an upper section and a lower section;
opposite short sides comprising an upper section and a lower section; and
a roof panel mounted onto the upper section of the sidewalls and the upper section of the short sides; and
a roof deployment system engaging said sidewalls and said short sides to concurrently elevate together translating the roof assembly between the lowered position and the elevated extended position; and
front and rear vehicle attachment interfaces;

a pullout assembly expandedly mounted on pullout slider beams affixed to each opposite longitudinal side of the base section of the central structure, said pullout assembly comprising a pullout assembly deployment system for translating the pullout assembly between a retracted state, positioned inside said central structure, and an expanded structure projecting from said central structure;

a power system for powering said central structure; and a powered vehicle for providing displacement of the central structure, the power system being mounted on a wheeled trailer and the central structure being suspendable through said front and rear vehicle attachment interfaces between the powered vehicle and the wheeled trailer.

* * * * *